United States Patent
Jantke et al.

(10) Patent No.: US 11,597,656 B2
(45) Date of Patent: Mar. 7, 2023

(54) METHODS FOR MODIFYING SILICON PARTICLES

(71) Applicant: WACKER CHEMIE AG, Munich (DE)

(72) Inventors: Dominik Jantke, Burghausen (DE); Rebecca Bernhard, Munich (DE); Peter Gigler, Dachau (DE); Jürgen Stohrer, Pullach (DE)

(73) Assignee: WACKER CHEMIE AG, Munich (DE)

( * ) Notice: Subject to any disclaimer, the term of this patent is extended or adjusted under 35 U.S.C. 154(b) by 663 days.

(21) Appl. No.: 16/344,675

(22) PCT Filed: Oct. 25, 2016

(86) PCT No.: PCT/EP2016/075682
§ 371 (c)(1),
(2) Date: Apr. 24, 2019

(87) PCT Pub. No.: WO2018/077389
PCT Pub. Date: May 3, 2018

(65) Prior Publication Data
US 2020/0055737 A1      Feb. 20, 2020

(51) Int. Cl.
| C01B 33/02 | (2006.01) |
| H01M 4/134 | (2010.01) |
| H01M 4/1395 | (2010.01) |
| H01M 4/38 | (2006.01) |

(52) U.S. Cl.
CPC .............. *C01B 33/02* (2013.01); *H01M 4/134* (2013.01); *H01M 4/1395* (2013.01); *H01M 4/386* (2013.01); *C01P 2004/61* (2013.01); *C01P 2004/80* (2013.01)

(58) Field of Classification Search
CPC ........ H01M 4/386; C01B 33/027; C09C 1/28; C30B 29/06; C01P 2004/61
See application file for complete search history.

(56) References Cited

U.S. PATENT DOCUMENTS

| 7,803,290 B2 | 9/2010 | Kosuzu et al. | |
| 2003/0235762 A1 | 12/2003 | Fukui et al. | |
| 2009/0191465 A1* | 7/2009 | Hwang | H01M 4/386 |
| | | | 429/331 |
| 2013/0136986 A1* | 5/2013 | Scoyer | C01B 33/027 |
| | | | 429/220 |
| 2016/0164085 A1 | 6/2016 | Hanelt | |
| 2018/0212234 A1 | 7/2018 | Haufe | |

FOREIGN PATENT DOCUMENTS

| DE | 102015215415 A1 | 2/2017 |
| EP | 1102340 A2 | 5/2001 |
| EP | 1313158 A2 | 5/2003 |
| JP | 201165796 A | 3/2011 |
| KR | 20130040198 A | 4/2013 |
| KR | 20160031010 A | 3/2016 |
| WO | 2017148872 | 9/2017 |

OTHER PUBLICATIONS

English Patent Abstract of Japan for JP 2011-65796 A.
English Abstract corresponding to WO 2017148872 A1.
Tichapondwa et al.; "Suppressing Hydrogen Evolution by Aqueous Silicon Powder Dispersions by Controlled Silicon Surface Oxidation", Propellants, Explosives, Pyrotechnics, 2013, vol. 38, pp. 48-55.
Touidjine et al.: "Partially Oxidized Silicon Particles for Stable Aqueous Slurries and Practical Large-Scale Making of Si-Based Electrodes" Journal of The Electrochemical Society, 2015, vol. 162 (8), pp. A1466 to A1475.

* cited by examiner

*Primary Examiner* — Khanh T Nguyen
(74) *Attorney, Agent, or Firm* — Brooks Kushman P.C.

(57) ABSTRACT

The invention relates to methods for producing non-aggregated, modified silicon particles by treating non-aggregated silicon particles which have volume-weighted particle size distributions with diameter percentiles $d_{50}$ of 1.0 μm to 10.0 μm at 80° C. to 900° C. with an oxygen-containing gas.

19 Claims, No Drawings

METHODS FOR MODIFYING SILICON PARTICLES

CROSS-REFERENCE TO RELATED APPLICATIONS

This application is a U.S. National Phase Application of PCT/EP2016/075682, filed Oct. 25, 2016the contents of which are incorporated herein by reference in its entirety for all purposes.

FIELD OF THE INVENTION

The invention relates to a process for modifying nonaggregated silicon particles by treatment with an oxygen-containing gas at elevated temperature, to thus obtainable nonaggregated, modified silicon particles and to the use thereof for producing aqueous ink formulations and anodes for lithium-ion batteries.

BACKGROUND OF THE INVENTION

Today, rechargeable lithium-ion batteries are the practicable electrochemical energy storage means having the highest the gravimetric energy densities. Silicon has a particularly high theoretic material capacity (4200 mAh/g) and is therefore particularly suitable as an active material for anodes of lithium-ion batteries. The production of anodes is carried out via anode inks in which the individual constituents of the anode material are dispersed in a solvent. On the industrial scale water is usually used as the solvent for the anode inks for economic and ecological reasons. However, the surface of silicon is very reactive toward water and is oxidized upon contact with water to form silicon oxides and hydrogen. The hydrogen liberation results in significant difficulties in the processing of anode inks. For example such inks may result in inhomogeneous electrode coatings on account of trapped gas bubbles. In addition hydrogen formation necessitates costly and inconvenient safety engineering measures. An undesired oxidation of silicon finally also results in a reduction of the silicon proportion in the anode, thus reducing the capacity of the lithium-ion battery.

Lithium-ion batteries comprising anode materials containing silicon particles are known for example from EP1313158. The silicon particles of EP1313158 have average particle sizes of 100 to 500 nm and are produced by milling and subsequent oxidative treatment with oxygen-containing gases. Larger particle sizes are considered disadvantageous for the Coulomb efficiency of corresponding batteries.

For oxidative treatment EP1313158 mentions temperatures of 80° C. to 450° C. in air and temperatures of 80° C. to 900° C. in inert gases having a low oxygen content. EP1313158 teaches away from choosing temperatures above 450° C. for oxidative treatment in air.

Touidjine, in Journal of The Electrochemical Society, 2015, 162, pages A1466 to A1475, is concerned with reducing hydrogen formation upon contact of ground silicon particles with water. In this regard Touidjine teaches at least partially oxidizing the silicon particles at elevated temperature using water or in air. The silicon particles used for oxidation have an $SiO_2$ content of 9% by weight and after air oxidation have an $SiO_2$ content of 11% by weight, in each case based on the total weight of the silicon particles. Touidjine's silicon particles have average particle sizes of 150 nm and are in the form of aggregates. The silicon particles used for oxidation have a BET specific surface area of 14 $m^2/g$ which is reduced in the course of the Touidjine air oxidation. Touidjine recommends the use of such partially oxidized silicon particles for producing aqueous anode inks for anodes of lithium-ion batteries.

Tichapondwa, in Propellants, Explosives, Pyrotechnics, 2013, 38, pages 48 to 55, discusses aqueous silicon dispersions as precursors for retarded pyrotechnic igniters. To inhibit hydrogen formation and thus to increase process safety upon contact of the silicon particles with water Tichapondwa recommends providing the surface of the silicon particles with a protective silicon oxide layer by oxidation at elevated temperature in air. The silicon particles subjected to oxidation have an average particle diameter of 2.06 µm, a BET surface area of 9.68 $m^2/g$ and are already oxidized to an extent of 13% based on the silicon and are in aggregated form. The oxidized silicon particles of Tichapondwa are also aggregated as shown by laser diffraction with and without ultrasound treatment. However, it is apparent from FIG. 1 of the Tichapondwa article that the oxidized aggregated silicon particles therein still liberate significant amounts of hydrogen in water—despite the very high oxide proportions.

DE102015215415.7 (filing number) discloses that silicon particles having a volume-weighted particle size distribution of $d_{10} \geq 0.2$ µm and $d_{90} \leq 20.0$ µm and a width $d_{90} - d_{10} \leq 15$ µm may be used as anode materials.

BRIEF SUMMARY OF THE INVENTION

Against this background the present application has for its object to provide silicon particles which upon use in aqueous ink formulations for producing anodes for lithium-ion batteries shall result in very little, if any, hydrogen formation, in particular not cause foaming of aqueous ink formulations or poor pumpability of the inks and also allow advantageous introduction of very high silicon proportions into the anodes as well as affording highly homogeneous anode coatings.

The present invention provides processes for producing nonaggregated, modified silicon particles by treating nonaggregated silicon particles having volume-weighted particle size distributions having diameter percentiles $d_{50}$ of 1.0 µm to 10.0 µm with an oxygen-containing gas at 80° C. to 90° C.

The invention further provides nonaggregated, modified silicon particles obtainable by the process according to the invention.

On account of their inventive production the nonaggregated, modified silicon particles are structurally distinct from the silicon particles employed as reactant. This is apparent for example from the fact that in water at room temperature the nonaggregated, modified silicon particles generally show a hydrogen evolution which, if present at all, is at least far lower compared to the silicon particles used as reactant for this process, thus allowing use thereof in aqueous ink formulations without foaming and also homogeneous coating for producing anodes for lithium-ion batteries.

The invention therefore further provides for the use of the process products according to the invention for producing aqueous ink formulations.

The invention further provides processes for producing aqueous ink formulations, characterized in that process products according to the invention and one or more binders are mixed with water.

The invention further provides for the use of the process products according to the invention for producing anodes for lithium-ion batteries.

DETAILED DESCRIPTION OF PREFERRED EMBODIMENTS

The nonaggregated silicon particles used in the process according to the invention are hereinbelow also referred to as a reactant Si particles for short. The nonaggregated, modified silicon particles produced according to the invention are also referred to as modified silicon particles.

The oxygen-containing gas contains preferably 1 to 100 vol %, particularly preferably 1 to 50 vol %, more preferably 5 to 35 vol %, yet more preferably 10 to 30 vol % and most preferably 15 to 25 vol % of oxygen based on the total volume of the oxygen-containing gas.

Further constituents of the oxygen-containing gas may be for example nitrogen or noble gases such as argon.

Air is preferred as the oxygen-containing gas.

Surprisingly, the treatment with air at elevated temperatures does not result in an uncontrolled reaction of the silicon particles with the oxygen, but rather results in the preferred oxide contents. According to the prior art the treatment of Si particles using 500 nm particles results in an oxide content of about 17% by weight corresponding to a layer thickness of 30 nm, while by contrast given otherwise identical particle treatment the process according to the invention can surprisingly achieve sheet far lower layer thicknesses. However, in contrast to Tichapondwa, the treatment with air surprisingly results in sufficient inhibition of hydrogen liberation in aqueous dispersions and in aqueous ink formulations even with low oxygen cons tents in the modified silicon particles.

The oxygen-containing gases may contain other reactive gases. Examples of reactive gases are water or alcohols, such as methanol or ethanol, in the gaseous state. Other reactive gases are present in amounts of preferably ≤3 vol %, more preferably ≤1 vol % and particularly preferably ≤0.1 vol % based on the total volume of the oxygen-containing gas. It is most preferable when no reactive gases are present.

The temperature for treatment of the reactant Si particles with an oxygen-containing gas is preferably ≥100° C., particularly preferably ≥120° C. and most preferably ≥150° C. The abovementioned temperature is preferably ≤800° C., particularly preferably ≤700° C. and most preferably ≤650° C.

Preferred temperature ranges for treatment of the reactant Si particles with an oxygen-containing gas are 80° C. to 400° C., particularly preferably 120° C. to 300° C. and most preferably 150° C. to 250° C.

Preferred temperature ranges for treatment of the reactant Si particles with an oxygen-containing gas are also 250° C. to 900° C., particularly preferably 400° C. to 800° C. and most preferably 500° C. to 700° C.

The duration of the treatment of the reactant Si particles with an oxygen-containing gas strongly depends on the chosen temperature and the desired degree of oxidation and may be adapted appropriately by those skilled in the art using just a few reference experiments. The duration may be for example 0.1 minutes to 24 hours, preferably 10 minutes to 15 hours, particularly preferably 0.5 to 10 hours and most preferably 1 to 6 hours. At a temperature of 500° C. to 700° C. the treatment has a duration of preferably 1 to 15 hours and particularly preferably 3 to 10 hours.

The pressure is preferably 0.5 to 2 bar, particularly preferably 0.8 to 1.5 bar and yet more preferably 1 atm. Operation at ambient pressure is most preferred.

The process may be carried out in conventional reactors, for example in a tube furnace, rotary tube furnace, fluidized bed reactor or a moving bed reactor. Calcination furnaces and rotary tube furnaces are particularly preferred. The process may be performed on a continuous or discontinuous basis.

The process is preferably performed in the absence of liquids, such as solvents, in particular in the absence of water or alcohols in liquid form.

The volume-weighted particle size distribution of the reactant Si particles has diameter percentiles $d_{50}$ of preferably 1.0 to 8.0 µm, particularly preferably 2.0 to 7.0 µm and most preferably 3.0 to 6.0 µm.

The volume-weighted particle size distribution of the reactant Si particles has diameter percentiles $d_{10}$ of preferably 0.5 µm to 10 µm, particularly preferably 0.5 µm to 5.0 µm and most preferably 0.5 µm to 3.0 µm.

The volume-weighted particle size distribution of the reactant Si particles has diameter percentiles $d_{90}$ of preferably 2.0 to 20.0 µm, particularly preferably 3.0 to 15.0 µm and most preferably 5.0 µm to 10.0 µm.

The volume-weighted particle size distribution of the reactant Si particles has a width $d_{90}-d_{10}$ of preferably ≤20.0 µm, more preferably ≤15.0 µm, yet more preferably ≤12.0 µm, particularly preferably ≤10.0 µm and most preferably ≤7.0 µm.

The volume-weighted particle size distribution of the reactant Si particles is determinable by statistical laser diffraction using the Mie model and using a Horiba LA 950 instrument and alcohols, for example ethanol or isopropanol, or preferably water as the dispersion medium for the silicon particles.

The reactant Si particles are nonaggregated, preferably nonagglomerated.

Aggregated is to be understood as meaning that spherical or largely spherical primary particles such as are initially formed for example in gas phase processes in the production of the reactant Si particles have coalesced to afford aggregates. The aggregation of primary particles may occur for example during production of silicon particles in the gas phase processes or for example during oxidation of the reactant Si particles. Such aggregates may form agglomerates in the further course of the reaction. Agglomerates are a loose cluster of aggregates. Agglomerates may easily be split back up into the aggregates using customary kneading and dispersing processes. Aggregates may be broken down into the primary particles only to a small extent, if at all, using these processes. Due to their formation, aggregates and agglomerates necessarily have very different sphericities and grain shapes to the preferred silicon particles. The presence of silicon particles in the form of aggregates or agglomerates may be made visible for example by customary scanning electron microscopy (SEM). By contrast, static light scattering methods for determining the particle size distributions or particle diameters of silicon particles cannot differentiate between aggregates or agglomerates.

The BET surface areas of the reactant Si particles are preferably 0.2 to 8.0 $m^2/g$, particularly preferably 0.5 to 5.0 m=/g and most preferably 1.0 to 5.0 mm/g. The BET surface area is determined according to DIN 66131 (with nitrogen).

The reactant Si particles have a sphericity of preferably 0.3≤ψ≤0.9, particularly preferably 0.5≤ψ≤0.85 and most preferably 0.65≤ψ≤0.85. Reactant Si particles having such sphericities are obtainable in particular by production by milling processes. The sphericity ψ is the ratio of the surface area of a sphere of identical volume to the actual surface area of a body (Wadell definition). Sphericities may be determined from conventional SEM images for example.

The reactant Si particles are preferably based on elemental silicon. Elemental silicon is to be understood as meaning high purity, polycrystalline silicon having a low proportion of foreign atoms (such as for example B, P, As), silicon intentionally doped with a small proportion of foreign atoms (such as for example B, P, As) but also silicon from metallurgical processing which may comprise elemental impurities (such as for example Fe, Al, Ca, Cu, Zr, Sn, Co, Ni, Cr, Ti, C).

Particularly preferred are reactant Si particles comprising internally ≥80 mol % of silicon and/or ≤20 mol % of foreign atoms, very particularly preferably ≤10 mol % of foreign atoms.

The reactant Si particles may also contain silicon oxide already. Any silicon oxide is preferably on the surface of the reactant Si particles. An oxide layer may completely or partially cover the surface of the reactant Si particles. Such oxide layers may form for example during production of the reactant Si particles and/or at temperatures below 80° C., in particular below 50° C. or below 30° C. and particularly preferably at room temperature, most preferably in air. Such oxide layers may be formed for example during storage of the reactant Si particles. Such oxide layers are also known as native oxide layers. Such native oxide layers are generally not suitable for solving the problem addressed by the invention. In addition, on an industrial scale storage of the Si particles for longer periods is undesirable. It is preferable when the reactant Si particles do not have an oxide layer such as is formed for example by longer term storage in air.

The reactant Si particles contain preferably ≤5.0% by weight, particularly preferably ≤2.0% by weight, yet more preferably ≤1.0% by weight and most preferably ≤0.5% by weight of oxygen based on the total weight of the reactant Si particles.

The reactant Si particles are producible for example by milling processes. However, the commonly used gas phase deposition is generally unsuitable for producing silicon particles according to the invention.

Reactant Si particles having the inventive properties, for example having advantageous sphericities, such as the fracture surfaces that are advantageous in use, in particular sharp-edged fracture surfaces or for example shard-like silicon particles, are obtainable by milling processes. The inventive particle size distributions of the reactant Si particles and nonaggregated reactant Si particles are also very readily obtainable by milling processes.

By contrast, silicon particles produced by gas phase processes generally have a round or acicular shape. Gas phase deposition typically results in aggregation of the particles. In order to produce nonaggregated silicon particles by gas phase processes the gas phase reactors would need to be operated with extremely low gas concentrations or extremely short reactor residence times which, however, counters formation of silicon particles with the inventive μ-scale particle size and results in industrially uneconomic production times. By contrast if aggregated silicon particles are acceptable, gas phase processes are exceptionally suitable for the production of μ-scale Si aggregates having primary particle sizes in the nanometer range.

Contemplated milling processes include for example wet or in particular dry milling processes. Preferably employed here are planetary ball mills, jet mills, such as counterjet or impact mills or stirred media mills. It is preferable when dry milling processes are employed, especially preferably in a jet mill.

The milling in the jet mill is preferably carried out with nitrogen or noble gases, preferably argon, as the milling gas.

The jet mills preferably comprise an integrated air classifier which may be static or dynamic or they are operated in a circuit with an external air classifier.

In the process according to the invention for producing the modified silicon particles reactant Si particles are preferably employed in native form. The reactant Si particles produced by the abovementioned process are preferably used in the process according to the invention for producing the modified silicon particles immediately and/or without further reaction, in particular without a preceding oxidation.

The reactant Si particles are generally partially oxidized by inventive treatment with oxygen-containing gas. This means that a portion of the silicon in the reactant Si particles is typically converted into silicon oxide. The reactant Si particle is preferably oxidized at the surface. An oxide layer, in particular a silicon oxide layer, is thus preferably formed at the surface of the reactant Si particle. The oxide layer may surround the surface of the modified silicon particle partially or preferably completely.

The oxygen content of the modified silicon particles is generally 0.05% to 4.0% by weight, particularly preferably 0.1% to 1.5% by weight, more preferably 0.15% to 0.6% by weight, greater than the oxygen content of the reactant Si particles in each case based on the total weight of the silicon particles. This describes the difference between the oxygen content of the modified silicon particles based on the total weight of the modified silicon particles and the oxygen content of the reactant Si particles based on the total weight of the reactant Si particles.

The modified silicon particles preferably contain 0.1% to 8.0% by weight, particularly preferably 0.12% to 6.0% by weight, more preferably 0.15% to 3.0% by weight and most preferably 0.2% to 1.5% by weight of oxygen based on the total weight of the modified silicon particles.

The average silicon oxide layer thickness at the surface of the modified silicon particles has a thickness of preferably 2 to 50 nm, particularly preferably 3 to 30 nm and most preferably 3 to 25 nm (determined as specified hereinbelow under the heading "determination of average silicon oxide layer thickness d(SiO$_2$)").

Further properties or parameters of the modified silicon particles, in particular the volume-weighted particle size distributions $d_{50}$, $d_{10}$, $d_{90}$ and the width $d_{90}$–$d_{10}$, the sphericities or the BET surface areas, preferably correspond to what is specified above for the reactant Si particles. This also applies to what is specified for the nonaggregated particles and, save for the oxygen content, to the chemical composition of the modified silicon particles.

The ink formulations are preferably based on a mixture comprising modified silicon particles produced according to the invention, one or more binders, optionally graphite, optionally one or more further electrically conductive components and optionally one or more additives.

Preferred binders are polyacrylic acid or the alkali metal, in particular lithium or sodium, salts thereof, polyvinyl alcohols, cellulose or cellulosic derivatives, polyvinylidine fluoride, polytetrafluoroethylene, polyolefins, polyimides, in particular polyamideimides, or thermoplastic elastomers, in particular ethylene-propylene-diene terpolymers. Particular preference is given to polyacrylic acid, polymethacrylic acid or cellulose derivatives, in particular polyacrylic acid or lithium or sodium salts thereof.

Employable graphites generally include natural or synthetic graphite. The graphite particles preferably have a volume-weighted particle size distribution between the diameter percentiles $d_{10}$>0.2 μm and $d_{90}$<200 μm.

Preferred further electrically conductive components are conductive carbon black, carbon nanotubes or metallic particles, for example copper.

Examples of additives are pore formers, dispersants, flow control agents or dopants, for example elemental lithium.

Preferred recipes for the ink formulations of lithium-ion batteries contain preferably 5% to 95% by weight, in particular 60% to 85% by weight of modified silicon particles produced according to the invention; 0% to 40% by weight, in particular 0% to 20% by weight, of further electrically conductive components; 0% to 80% by weight, in particular 5% to 30% by weight of graphite; 0% to 25% by weight, in particular 5% to 15% by weight of binders; and optionally 0% to 80% by weight, in particular 0.1% to 5% by weight of additives; wherein the amounts in % by weight are based on the total weight of the ink formulations and the proportions of all constituents of the ink formulations sum to 100% by weight.

The processing of the constituents of the ink formulations to afford an anode ink/paste is preferably performed in water or in an aqueous solvent. An aqueous solvent generally contains water and one or more organic solvents. Examples of organic solvents are tetrahydrofuran, N-methylpyrrolidone, N-ethylpyrrolidone, acetone, dimethylsulfoxide, dimethylacetamide or ethanol. The proportion of organic solvents is preferably ≤50 vol %, more preferably ≤20 vol % and particularly preferably ≤10 vol % based on the total volume of the aqueous solvent. It is most preferable when the water contains no organic solvent.

To produce the ink formulations conventional apparatuses may be used such as for example rotor-stator machines, dissolver mixers, high-energy mills, planetary mixers, kneaders, stirred media mills, shakers or ultrasonicators.

The ink formulations have a pH of preferably 2 to 9, particularly preferably 5 to 8 and most preferably 6.5 to 7.5 (determined at 20° C., for example with a WTW pH 340i pH meter with a SenTix RJD probe).

To produce an anode for lithium-ion batteries the ink formulations may for example be knife coated onto a copper foil or another current collector. Other coating processes, for example spin-coating, roller coating, immersion coating, slot die coating, brush coating or spraying may likewise be used.

The layer thickness, i.e. the dry layer thickness of the anode coating, is preferably 2 μm to 500 μm, particularly preferably from 10 μm to 300 μm.

The anode material is generally dried to a constant weight. The drying temperature is preferably between 20° C. and 300° C., particularly preferably between 50° C. and 150° C.

A lithium-ion battery generally comprises a first electrode as a cathode, a second electrode as an anode, a membrane disposed between the two electrodes as a separator, two electrically conductive terminals connected to the electrodes, a housing which accommodates the recited parts and a lithium-ion-containing electrolyte with which the separator and the two electrodes are saturated, wherein a portion of the second electrode contains the anode material according to the invention.

All substances and materials used for producing the lithium-ion battery according to the invention, as described hereinabove, are known. Production of the parts of the battery according to the invention and their combination to afford the battery according to the invention may be carried out according to the processes known in the field of battery production, as described for example in the patent application having application number DE102015215415.7

The silicon particles modified according to the invention are surprisingly particularly stable in water, in particular in aqueous ink formulations for anodes of lithium-ion batteries, and under such conditions have a low propensity, if any, for hydrogen formation. This allows for their use without foaming of the aqueous ink formulations and for the production of particularly homogeneous/gas bubble-free anodes. By contrast, the silicon employed as reactant in the process according to the invention generates large amounts of hydrogen in water.

The fact that the modified silicon particles according to the invention are in nonaggregated form is also conducive to obtaining homogeneous anode coatings. This is because in aggregates a plurality or even a multiplicity of silicon particles form lumps, thus adversely affecting achievement of a highly homogeneous distribution of the individual silicon particles in the anode inks or in the anode coatings. In addition, anodes comprising nonaggregated silicon particles exhibit better electrochemical performance. A further improvement in the cycle stability of the lithium-ion batteries is achievable when the batteries are operated under part load, such as is described in the patent application having filing number DE102015215415.7.

Surprisingly, the inventive reduction in the hydrogen formation is also achievable with silicon particles according to the invention that are oxidized only to a small extent and thus carry a very thin oxide layer. Silicon particles having a low SiOx-proportion necessarily have a higher silicon proportion and therefore also a greater storage capacity for lithium ions, thus resulting in lithium-ion batteries having higher energy densities. The preferred particle sizes of the inventive silicon particles are also conducive thereto. Silicon particles having particle sizes according to the invention additionally exhibit advantageous rheology behavior and thus better processing properties in anode inks than silicon particles having smaller particle sizes which have a greater propensity for thickening the anode inks. This makes it possible to obtain electrode inks having higher solids contents which reduces drying costs for the electrode coating and contributes to greater resource efficiency.

The following examples further elucidate the invention:

Determination of Particle Sizes:

Measurement of particle size distribution was performed by static laser diffraction using the Mie model and using a Horiba LA 950 in a highly dilute suspension in water or isopropanol. The specified average particle sizes are volume-weighted.

Determination of Oxygen Content (O Content):

Determination of oxygen content was performed using a Leco TCH-600 analyzer. Analysis was carried out by melting the samples in graphite crucibles under an inert gas atmosphere. Detection was by infrared (three analysis cells).

Determination of Average Silicon Dioxide Layer Thickness $d(SiO_2)$:

Determination of the average silicon dioxide layer thickness $d(SiO_2)$ for the modified silicon particles was carried out according to the formula:

$$d(SiO_2) = \frac{1}{2} * d_{50}(Si) * \left(1 - \sqrt[3]{1 - \left([O-\text{content}] * \frac{M(SiO_2)}{M(O_2)}\right)}\right)$$

The input variables for the formula are:

$d_{50}$ (Si):

$d_{50}$ value for the volume-weighted particle size distribution of the modified silicon particles, determined as recited hereinabove under the heading "determination of particle sizes";

O content:

oxygen content of the modified silicon particles, determined as recited hereinabove;

$M(SiO_2)$: molar mass of silicon dioxide ($SiO_2$): 60.084 g/mol;

$M(O_2)$: molar mass of oxygen ($O_2$): 31.998 g/mol.

The densities of silicon and silicon dioxide may be neglected here since these have identical or virtually identical values for both species.

Determination of Hydrogen Evolution ($H_2$ Evolution) by GC Analysis (Headspace):

50 mg (for determination at 80° C.) or 100 mg (for determination at 40° C.) of the sample were weighed into a GC Headspace vial (22 ml) and admixed with 5 ml of an aqueous Li acetate buffer (pH 7; 0.1 M), the vial was sealed and with stirring held at 40° C. for 60 minutes/heated to 80° C. for 30 minutes in an aluminum block.

The temperature at which the determination of hydrogen evolution was performed is reported next to the respective experiments.

For the measurement of hydrogen evolution from aqueous anode inks 5 g or 15 g of the freshly produced anode ink were introduced into a GC headspace vial and stored at room temperature for the reported duration before the $H_2$ content in the gas phase was determined.

Determination of hydrogen content in the gas phase was performed by GC analysis. Detection was by thermal conductivity. The hydrogen proportion was reported in volume percent of the gas phase. Further detected gases were oxygen, nitrogen and argon.

EXAMPLE 1

Production of Si Particles a (Noninventive):

The Si particles A were produced according to the prior art by milling coarse crushed silicon from the production of solar silicon in a fluidized bed jet mill (Netzsch-Condux CGS16 with 90 m³/h of nitrogen at 7 bar as milling gas). The obtained particles were filled into receptacles under inert gas and stored thus. After removal of the particles in air the analytical data reported in table 1 were obtained.

Production of Si Particles B (Inventive):

Si particles A (151.90 g) were heated in air at 80° C. for 6 h in a glass dish in a Heraeus, T6060 drying cabinet. After cooling to room temperature the thus obtained modified silicon particles B were removed, reweighed (152.10 g) and analyzed. The stability of the silicon particles in water was analyzed by GC, as specified under the heading "hydrogen evolution ($H_2$—evolution)". The results obtained are shown in table 1.

Production of Si Particles C (Inventive):

Silicon particles A (829.2 g, cf. table 1) were introduced into an evaporating dish and placed in a ThermoConcept KK480 calcination furnace. The interior of the furnace was heated to 600° C. for a duration of 6 h, ensuring airflow to the Si bed.

After cooling to room temperature the thus obtained modified silicon particles C were removed, reweighed (832.8 g) and analyzed. The stability of the silicon particles in water was analyzed by GC, as specified under the heading "hydrogen evolution ($H_2$-evolution)". The results obtained are shown in table 1.

TABLE 1

Analytical data of the Si particles and reaction conditions for the oxidation:

|  | Si particles A (comparison) | Si particles B | Si particles C |
|---|---|---|---|
| Temperature | — | 80° C. | 600° C. |
| Duration | — | 6 h | 6 h |
| $d_{10}$ | 2.4 μm | 2.3 μm | 2.3 μm |
| $d_{50}$ | 4.7 μm | 4.7 μm | 4.8 μm |
| $d_{90}$ | 7.9 μm | 7.9 μm | 7.9 μm |
| O content | 0.16% | 0.22% | 0.72% |
| $d(SiO_2)$ | 2.2 nm | 3.1 nm | 10.6 nm |
| $H_2$ evolution (40° C.) | 0.29 vol % | 0.07 vol % | 0.00 vol % |
| $H_2$ evolution (80° C.) | 0.67 vol % | 0.26 vol % | 0.00 vol % |

$d_{50}$: diameter percentiles $d_{50}$ of the volume-weighted particle size distributions of the particles A, B and C;
$d(SiO_2)$: calculated average silicon dioxide layer thickness on the surface of the Si particles.

The reactant Si particles show significant $H_2$ evolution even at 40° C. The inventive products show very little, if any, $H_2$ evolution at 40° C.

Example 2: Production of Aqueous Ink Formulations 127.5 g of the respective silicon particles were mixed with 45.5 g of graphite (KS6L from Imerys) and with 100 g of an aqueous LiPAA binder solution (produced from LiOH und polyacrylic acid, m.w. 450 k, Sigma-Aldrich, prod. no. 181285) (4% by weight, pH 6.9) with a planetary mixer (PC Laborsystem LPV 1 G2). After 60 minutes of stirring time at 50 rpm a further 119.5 g of the abovementioned LiPAA binder solution were added and stirred for a further 60 minutes at 100 rpm. For analysis of $H_2$ evolution 5 g (Si particles A) or 15 g (Si particles B/C) of the respective ink were filled into a headspace vial (20 ml total volume) and stored at room temperature. The composition of the gas space was analysed after the times reported in table 2. The analytical data are summarized in table 2.

TABLE 2

Hydrogen evolution of aqueous ink formulations:

|  | Ink A (comparative) | Ink B (inventive) | Ink C (inventive) |
|---|---|---|---|
| Si particles | Si particles A (comparative) | Si particles B (inventive) | Si particles C (inventive) |
| $H_2$ evolution | 48 vol % (1 day) (5 g ink) (17 ml gas space) | 0.00 vol % (1 day) (5 g ink) (17 ml gas space) | 0.00 vol % (7 days) (15 g ink) (7 ml gas space) |

The comparative ink containing silicon particles A showed severe foaming during processing with the planetary mixer and also severe $H_2$ evolution even after a short standing time while the inventive inks containing the modified silicon particles B or C showed no $H_2$ evolution even after prolonged standing times.

Both inventive ink formulations are processable into homogeneous electrode coatings.

The electrode coating comprising Si particles A has a propensity for bursting of the coating, and thus for nonhomogeneous coating, on account of the severe hydrogen evolution.

The invention claimed is:

1. A method for producing nonaggregated, modified silicon particles, comprising:

treating nonaggregated reactant silicon particles having a volume-weighted particle size distribution with a diameter percentile $d_{50}$ of 3.0 μm to 7.0 μm with an oxygen-containing gas at 80° C. to 900° C. and recovering nonaggregated, modified silicon particles containing 0.1-3.0% by weight of oxygen based on the total weight of the non-aggregated, modified silicon particles, with the proviso that the nonaggregated, modified silicon particles have an oxygen content which is 0.05% to 0.6% by weight greater than the oxygen content of the nonaggregated silicon particles based on the total weight of the silicon particles and have a BET surface area of 0.2 to 8.0 $m^2/g$.

2. The method of claim 1, wherein the oxygen-containing gas contains 1 to 100 vol % of oxygen based on the total volume of the oxygen-containing gas.

3. The method of claim 2, wherein the treatment with an oxygen-containing gas is carried out at 400° C. to 800° C.

4. The method of claim 2, wherein the treatment with an oxygen-containing gas is carried out at 80° C. to 400° C.

5. The method of claim 1, wherein the oxygen-containing gas contains from 1 to 5 vol. % of oxygen based on the total volume of the oxygen-containing gas.

6. The method of claim 1, wherein the nonaggregated silicon particles contain ≤2.0% by weight of oxygen.

7. The method of claim 1, wherein the nonaggregated, modified silicon particles contain 0.2% to 1.5% by weight of oxygen based on the total weight of the nonaggregated, modified silicon particles.

8. The method of claim 1, wherein the nonaggregated silicon particles are nonagglomerated.

9. The method of claim 1, wherein surfaces of the nonaggregated, modified silicon particles have a silicon oxide layer with an average layer thickness of 2 to 50 nm.

10. The method of claim 1, wherein the nonaggregated, modified silicon particles have a volume-weighted particle size distribution with a diameter percentile $d_{50}$ of 5.0 μm to 7.0 μm.

11. The method of claim 1, wherein the nonaggregated silicon particles and/or the nonaggregated, modified silicon particles have BET surface areas of 0.5 to 5.0 $m^2/g$ determined according to DIN 66131 with nitrogen.

12. Nonaggregated, modified silicon particles obtained by the method of claim 1.

13. The nonaggregated, modified silicon particles of claim 12, wherein the nonaggregated, modified silicon particles contain 0.2% to 1.5% by weight of oxygen based on the total weight of the nonaggregated, modified silicon particles.

14. A method for producing an aqueous ink formulations, comprising:

mixing nonaggregated, modified silicon particles of claim 12 with one or more binders and water.

15. An anode for lithium-ion batteries, comprising nonaggregated, modified silicon particles prepared by the method of claim 1.

16. The anode for lithium-ion batteries of claim 15, wherein silicon particles in the anode material are only partly lithiated in the fully charged lithium-ion battery.

17. The nonaggregated, modified silicon particles of claim 1, having a BET surface area between 1.0 and 5.0 $m^2/g$.

18. The nonaggregated, modified silicon particles of claim 1, which are prepared by milling metallurgical grade silicon into particles with sharp-edged fracture surfaces.

19. The nonaggregated, modified silicon particles of claim 1, wherein the oxygen content is from 0.1 to 0.6 wt. % greater than the oxygen content of the reactant silicon particles.

\* \* \* \* \*